United States Patent
Prabhudeva et al.

(10) Patent No.: US 10,750,339 B2
(45) Date of Patent: Aug. 18, 2020

(54) SYSTEM FOR DYNAMICALLY ALLOCATING SERVICES BETWEEN CONTROLLERS IN AN AUTOMOBILE

(71) Applicant: Ford Global Technologies, LLC, Dearborn, MI (US)

(72) Inventors: Raghu Prabhudeva, Farmington Hills, MI (US); Aishwarya Vasu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 15/870,218

(22) Filed: Jan. 12, 2018

(65) Prior Publication Data

US 2019/0222984 A1    Jul. 18, 2019

(51) Int. Cl.
| | | |
|---|---|---|
| H04W 4/44 | (2018.01) | |
| H04L 29/08 | (2006.01) | |
| H04W 4/48 | (2018.01) | |
| G07C 5/00 | (2006.01) | |

(52) U.S. Cl.
CPC .............. *H04W 4/44* (2018.02); *G07C 5/008* (2013.01); *H04L 67/025* (2013.01); *H04L 67/1008* (2013.01); *H04L 67/12* (2013.01); *H04L 67/125* (2013.01); *H04W 4/48* (2018.02)

(58) Field of Classification Search
CPC ....... G07C 5/008; H04B 1/3822; H04L 29/06; H04L 67/02; H04L 67/025; H04L 67/1008; H04L 67/12; H04L 67/125; H04L 67/16; H04L 67/32; H04L 67/34; H04L 69/329; H04W 4/44; H04W 4/48
See application file for complete search history.

(56) References Cited

U.S. PATENT DOCUMENTS

| | | | |
|---|---|---|---|
| 8,775,615 B2 | 7/2014 | Jalaldeen et al. | |
| 2009/0319656 A1* | 12/2009 | Yang | H04L 41/065 709/224 |
| 2010/0251258 A1* | 9/2010 | Hanamori | G06F 9/5088 718/105 |
| 2011/0078303 A1* | 3/2011 | Li | G06F 9/505 709/224 |
| 2014/0140254 A1* | 5/2014 | Nieminen | H04W 4/70 370/311 |
| 2015/0317196 A1* | 11/2015 | Kazi | H04L 9/3242 714/47.2 |
| 2015/0331422 A1* | 11/2015 | Hartung | G05D 1/021 701/23 |
| 2016/0142303 A1 | 5/2016 | Kim et al. | |

OTHER PUBLICATIONS

An Adaptive Software and Systems Architecture for Driver Assistance Systems Based on Service Orientation, International Journal of Machine Learning and Computing, V1, pp. 363-364, Published Oct. 2011.

* cited by examiner

*Primary Examiner* — Christopher Biagini
(74) *Attorney, Agent, or Firm* — Michael Spenner; Brooks Kushman PC

(57) ABSTRACT

A vehicle includes a plurality of controllers configured to communicate over a network and programmed to perform a service by operation of a plurality of routines stored and executed in at least one of the controllers. The vehicle includes a gateway controller in communication with the controllers and programmed to transfer at least one of the routines from a first controller to a second controller responsive to performance data indicating reduced performance of the first controller.

18 Claims, 3 Drawing Sheets

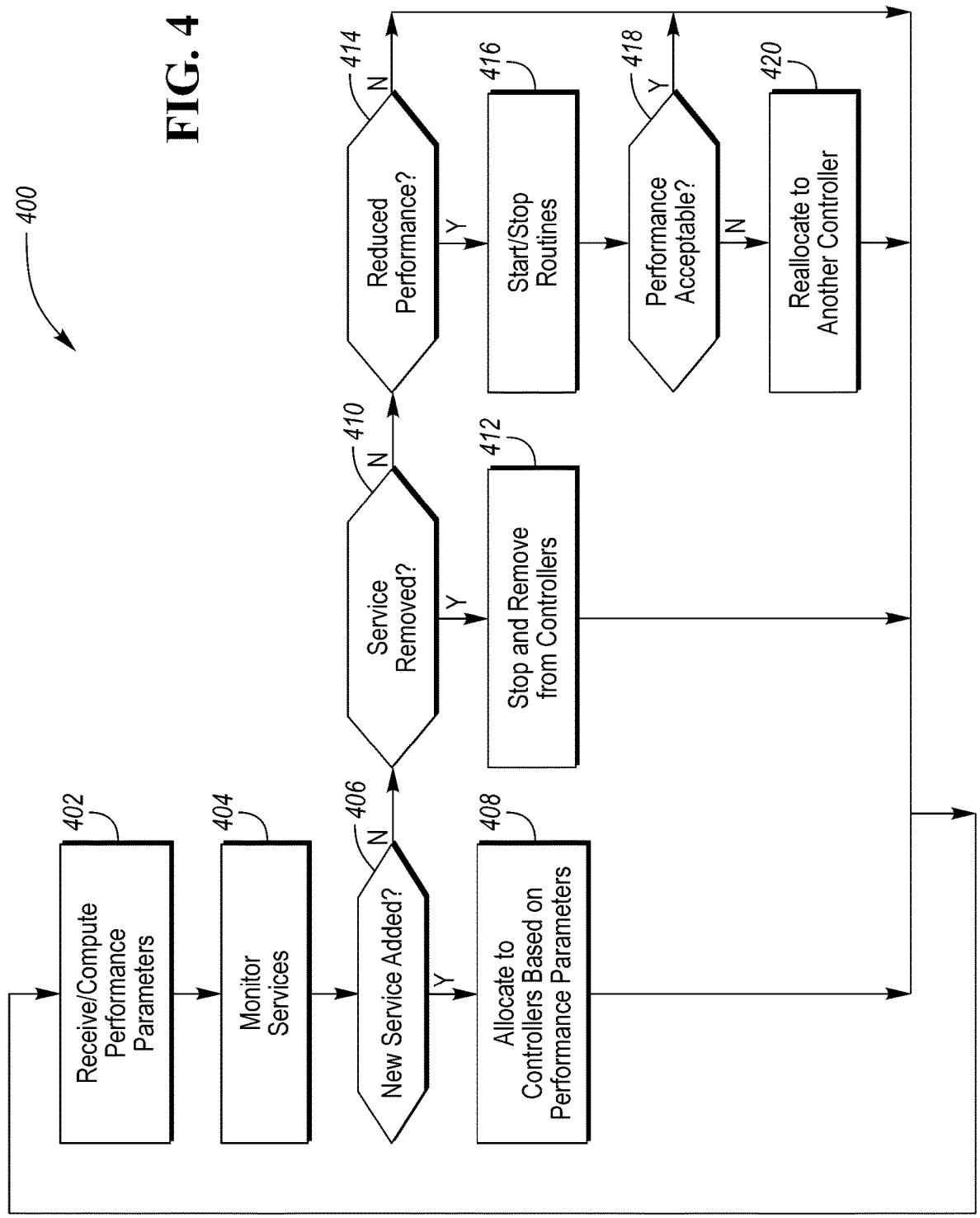

SYSTEM FOR DYNAMICALLY ALLOCATING SERVICES BETWEEN CONTROLLERS IN AN AUTOMOBILE

TECHNICAL FIELD

This application generally relates to a vehicle communications system that allocates service routines to controllers in a vehicle.

BACKGROUND

An automobile includes a number of controllers. The controllers are programmed to perform a particular set of vehicle-related functions. For example, a controller may be programmed to manage door locks and windows. During the lifetime of the controller, that set of functions remains the same. A controller programmed to manage door locks and windows will perform those same functions over the life of the vehicle. Controllers are also designed to have some memory and processing reserve to ensure sufficient execution time and resources for all of the functions executed by the controller. In the event of a partial or complete controller failure, those functions implemented by that controller are lost. Existing systems are not tolerant to faults.

SUMMARY

A vehicle includes a plurality of controllers configured to communicate over a network and programmed to perform a service by operation of a plurality of routines stored and executed in at least one of the controllers. The vehicle further includes a gateway controller in communication with the controllers and programmed to transfer at least one of the routines from a first controller to a second controller responsive to performance data indicating reduced performance of the first controller.

The network may be an Ethernet network and the controllers may be further configured to implement a Constrained Application Protocol (CoAP) over the Ethernet network. The data indicating reduced performance may include a response time of the service exceeding a predetermined time. The data indicating reduced performance may include a loss of communication for more than a predetermined time between the gateway controller and the first controller. The data indicating reduced performance may include a communication bandwidth between the first controller and the gateway controller being less than a predetermined bandwidth. The gateway controller may be further configured to, responsive to performance data indicating reduced performance, send a command to the first controller to stop and restart the routines. The gateway controller may be further coupled to an external network and programmed to communicate with an application running on an external server via the external network using Hyper Text Transfer Protocol (HTTP).

A vehicle includes a plurality of controllers programmed to execute a plurality of routines to perform a service and communicate over a vehicle network using Constrained Application Protocol (CoAP). The vehicle further includes a gateway controller configured to communicate with an external server using Hyper Text Transfer Protocol (HTTP), communicate over the vehicle network using CoAP, and execute a service manager that dynamically allocates the routines between controllers based on performance parameters of the controllers.

The gateway controller may be further programmed to transfer performance parameters to the external server. The performance parameters may include a response time between an arrival of a request to perform a service and completion of the request. The performance parameters may include a communication bandwidth between controllers utilized over the vehicle network. The performance parameters may include a frequency of usage for the service. The gateway controller may be further programmed to, responsive to receiving a plurality of new service routines for performing a new service from the external server, dynamically allocate and transfer the new service routines to the controllers based on the performance parameters. The gateway controller may be programmed to allocate the routines based on resource usage and remaining processing capacity of the controllers. The gateway controller may be further programmed to, responsive to the performance parameters of a first controller being indicative of a reduction in performance of the first controller, transfer at least one of the routines executed by the first controller to a second controller.

A vehicle communication system includes a gateway controller programmed to communicate with an external server using Hyper Text Transfer Protocol (HTTP), communicate with an internal vehicle network via Constrained Application Protocol (CoAP) protocol, and execute a service manager that dynamically allocates a plurality of service routines associated with a service between a plurality of controllers connected to the internal vehicle network based on performance parameters of the controllers.

The gateway controller may be further programmed to receive performance parameters from the controllers. The gateway controller may be further programmed to communicate performance parameters to the external server. The gateway controller may be further programmed to receive service statistics from each of the controllers and transmit the service statistics to the external server. The gateway controller may be further programmed to arbitrate access to the external server for the controllers.

BRIEF DESCRIPTION OF THE DRAWINGS

FIG. 4 is a flowchart for a possible set of operations performed by a service manager that implements a distributed service architecture in a vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
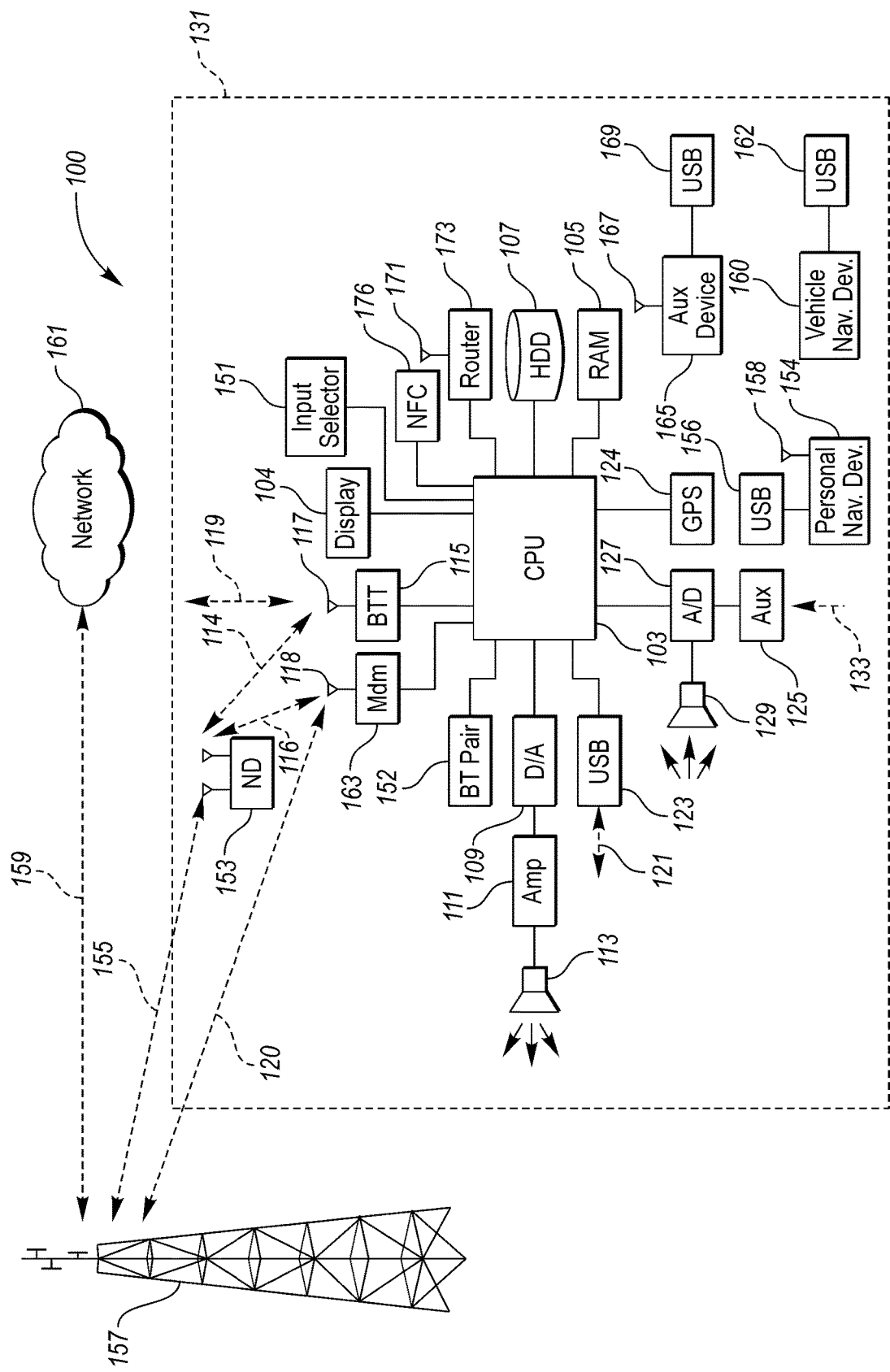
FIG. 1 is a possible configuration of a vehicle communication system.

FIG. 1 illustrates an example block topology for a vehicle-based computing system 100 (VCS) for a vehicle. An example of such a vehicle-based computing system 100 is the SYNC system manufactured by THE FORD MOTOR COMPANY. The vehicle enabled with the vehicle-based computing system 100 may contain a visual front-end interface 104 located in the vehicle. The user may be able to interact with the interface 104 if it is provided, for example, with a touch sensitive screen. In another illustrative embodiment, the interaction occurs through, button presses, spoken dialog system with automatic speech recognition and speech synthesis.

In the illustrative embodiment shown in FIG. 1, at least one processor 103 controls at least some portion of the operation of the vehicle-based computing system 100. Provided within the vehicle 131, the processor 103 allows onboard processing of commands and routines. Further, the processor 103 is connected to both non-persistent 105 and persistent storage 107. In this illustrative embodiment, the non-persistent storage 105 is random access memory (RAM) and the persistent storage 107 is a hard disk drive (HDD) or flash memory. Non-transitory memory may include both persistent memory and RAM. In general, persistent storage 107 may include all forms of memory that maintain data when a computer or other device is powered down. These include, but are not limited to, HDDs, CDs, DVDs, magnetic tapes, solid state drives, portable USB drives and any other suitable form of persistent memory.

The processor 103 may also include several different inputs allowing the user and external systems to interface with the processor 103. The vehicle-based computing system 100 may include a microphone 129, an auxiliary input port 125 (for input 133), a Universal Serial Bus (USB) input 123, a Global Positioning System (GPS) input 124, a screen 104, which may be a touchscreen display, and a BLUETOOTH input 115. The VCS 100 may further include an input selector 151 that is configured to allow a user to swap between various inputs. Input from both the microphone 129 and the auxiliary connector 125 may be converted from analog to digital by an analog-to-digital (A/D) converter 127 before being passed to the processor 103. Although not shown, numerous of the vehicle components and auxiliary components in communication with the VCS may use a vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the VCS 100 (or components thereof).

Outputs from the processor 103 may include, but are not limited to, a visual display 104 and a speaker 113 or stereo system output. The speaker 113 may be connected to an amplifier 111 and receive its signal from the processor 103 through a digital-to-analog (D/A) converter 109. Outputs can also be made to a remote BLUETOOTH device such as a Personal Navigation Device (PND) 154 or a USB device such as vehicle navigation device 160 along the bi-directional data streams shown at 119 and 121 respectively.

In one illustrative embodiment, the system 100 uses the BLUETOOTH transceiver 115 with an antenna 117 to communicate with a user's nomadic device 153 (e.g., cell phone, smart phone, Personal Digital Assistance (PDA), or any other device having wireless remote network connectivity). The nomadic device 153 can then be used to communicate over a tower-network communication path 159 with a network 161 outside the vehicle 131 through, for example, a device-tower communication path 155 with a cellular tower 157. In some embodiments, tower 157 may be a wireless Ethernet or WiFi access point as defined by Institute of Electrical and Electronics Engineers (IEEE) 802.11 family of standards. Exemplary communication between the nomadic device 153 and the BLUETOOTH transceiver 115 is represented by Bluetooth signal path 114.

Pairing the nomadic device 153 and the BLUETOOTH transceiver 115 can be instructed through a button 152 or similar input. Accordingly, the CPU is instructed that the onboard BLUETOOTH transceiver 115 will be paired with a BLUETOOTH transceiver in a nomadic device 153.

Data may be communicated between CPU 103 and network 161 utilizing, for example, a data-plan, data over voice, or Dual Tone Multi Frequency (DTMF) tones associated with nomadic device 153. Alternatively, it may be desirable to include an onboard modem 163 having antenna 118 in order to establish a vehicle-device communication path 116 for communicating data between CPU 103 and network 161 over the voice band. The nomadic device 153 can then be used to communicate over the tower-network communication path 159 with a network 161 outside the vehicle 131 through, for example, device-tower communication path 155 with a cellular tower 157. In some embodiments, the modem 163 may establish a vehicle-tower communication path 120 directly with the tower 157 for communicating with network 161. As a non-limiting example, modem 163 may be a USB cellular modem and vehicle-tower communication path 120 may be cellular communication.

In one illustrative embodiment, the processor 103 is provided with an operating system including an application programming interface (API) to communicate with modem application software. The modem application software may access an embedded module or firmware on the BLUETOOTH transceiver 115 to complete wireless communication with a remote BLUETOOTH transceiver (such as that found in a nomadic device 153). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications systems such as RFID.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device 153, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device 153 may be a wireless local area network (LAN) device capable of communication over, for example (and without limitation), an IEEE 802.11g network (i.e., WiFi) or a WiMax network.

In one embodiment, incoming data can be passed through the nomadic device 153 via a data-over-voice or data-plan, through the onboard BLUETOOTH transceiver 115 and to the vehicle's internal processor 103. In the case of certain temporary data, for example, the data can be stored on the HDD or other storage media 107 until the data is no longer needed.

Additional sources that may interface with the vehicle-based computing system 100 include a personal navigation device 154, having, for example, a USB connection 156 and/or an antenna 158, a vehicle navigation device 160 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 103 may be in communication with a variety of other auxiliary devices 165. The auxiliary devices 165 can be connected through a wireless (e.g., via auxiliary device antenna 167) or wired (e.g., auxiliary device USB 169) connection. Auxiliary devices 165 may include, but are not limited to, personal media players, wireless health devices, portable computers, and the like.

Also, or alternatively, the CPU 103 may be connected to a vehicle-based wireless router 173, using for example a WiFi (IEEE 802.11) transceiver/antenna 171. This may allow the CPU 103 to connect to remote networks in range of the local router 173. In some configurations, the router 173 and the modem 163 may be combined as an integrated unit. However, features to be described herein may be applicable to configurations in which the modules are separate or integrated.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
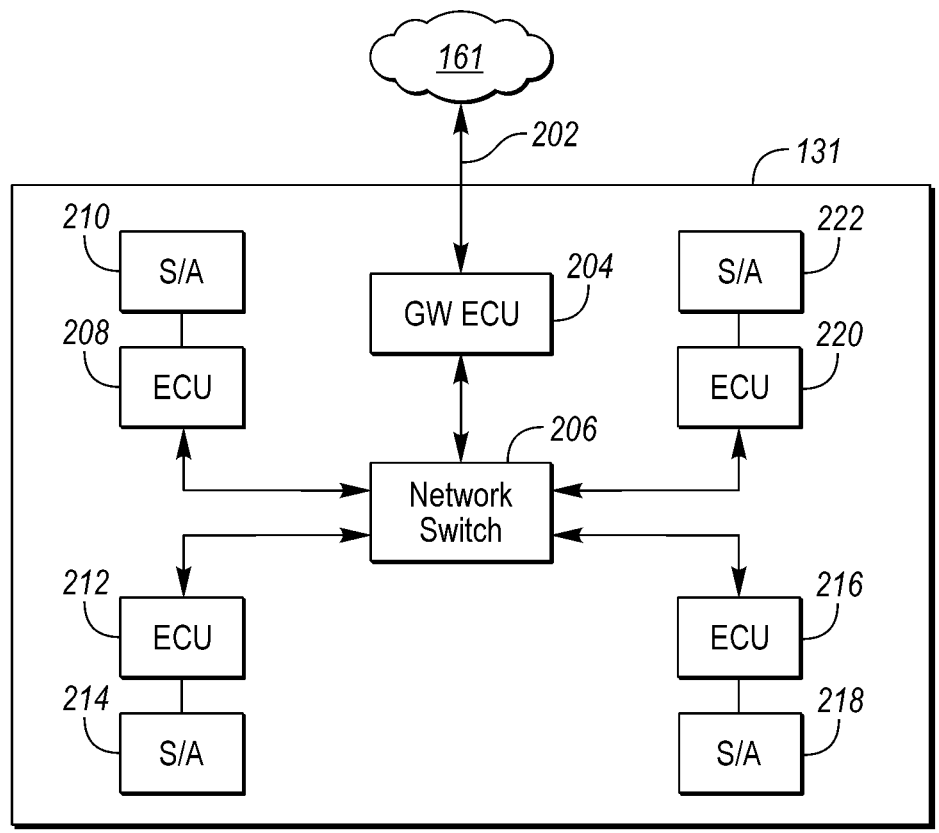
FIG. 2 is a possible configuration for a distributed processing architecture for a vehicle.

The vehicle-based computing system 100 may act as a gateway between external networks (e.g., 161) and an internal vehicle network. FIG. 2 depicts a possible diagram for a decentralized architecture for connecting multiple controllers in the vehicle 131. Vehicle systems may include any number of controllers. The controllers may be programmed to implement various services. A service may be implemented in hardware/firmware to perform a particular set of operations related to a feature or function. For example, services may be implemented to lock and unlock doors, measure and transmit a particular sensor signal, or perform a diagnostic request. Services may be periodically triggered for real-time operations. Services may be triggered on demand as when an external diagnostic request is received or other user initiated function is to be performed. Services can be implemented as a single routine in a single controller or may be implemented as multiple routines in multiple controllers.

A decentralized architecture is beneficial for control services, such as those implemented in a vehicle. It avoids the bottleneck of a single central orchestrator and ensures that not all services cease to work if the orchestrator fails. A distributed architecture is also beneficial from an optimization point of view, as the amount of transferred data can often be reduced by placing the data consuming control logic in proximity to the data producers. Furthermore, at any time, new services with previously unknown functionality can be added. To support these dynamics, a controller may manage and provide a repository of the available services on the network and a logging facility that allows tracing changes. Since new applications can be installed at run-time, the purpose of individual services in the network is not fixed and may change throughout the lifetime of the network. This requires a dedicated life cycle management that supports the installation, startup, shutdown, and removal of services in the controllers connected to the network.

Services may be executed on devices with limited storage and processing capabilities and may benefit from efficient message formats for the communication between these devices. Efficient communication may be achieved by defining a clear separation between the description of the data, which is specified only once, and the transmission format, which contains solely the raw data payload in a binary representation. Additionally, services and software may be designed in an efficient way to facilitate the execution on resource constrained devices. In such systems, minimal communication overhead is desired. Services may be comprised of a plurality of service routines that are executed in a plurality of controllers that are coupled to the network. Intelligent distribution of the service routines among the controllers can minimize network bandwidth that is necessary for transferring data between controllers.

As demand for connectivity and cloud communication increases in vehicle applications, the automotive embedded network will continue to evolve to include a variety of controllers based on different platforms (e.g., operating systems, programming languages etc.). An additional challenge is that each controller may be designed and developed by a different vendor using different platforms. Hence, the software should support vendor independent interoperable cross platform solutions. Any software solution should facilitate interoperability and data exchange among different products or services that are intended for widespread adoption.

Control services running on automotive networks may be data driven. In a data driven environment, data may be acquired periodically from the sensors and pushed to connected services that are executed in the controllers. These services may produce new data based on the received input that may then be pushed to the next service in the processing chain. Control services running on automotive networks may also be control driven. In a control driven environment, client applications may interact with services through abstract device interactions. Services may then, in turn, control the devices (e.g., a service may open/close rear windows by issuing command upon request by client routines). Generic commands may be defined and control services may be implemented to perform the generic commands. The high-level user or service may communicate using the generic commands without specific knowledge of how or in which controller(s) the generic command is implemented. For example, the interface may consist of Hyper Text Transfer Protocol (HTTP) type operations such as GET, POST, PUT, and DELETE.

Vehicle networks do not operate in isolation and are often configured to access wide area networks and/or the Internet. Web service-based interfaces may be implemented to integrate vehicle networks and external components. The challenge is to connect the Web service domain, with its high resource demand and its highly available components, to the vehicle network domain, with its small footprint nodes. Web service interfaces alone are not sufficient for the integration of vehicle networks with enterprise back ends (e.g., in a shop floor integration scenario). Additionally, the data delivered by the sensor network may be integrated into the enterprise knowledge domain. This may involve semantic information that allows combining the measured data with the information contained in the back-end databases. A vehicle network may also address security issues. Security features in the automotive network may include integrity, authentication, and confidentiality. The design of the software solution may provide mechanisms to address and implement the above-mentioned security features.

Referring to FIG. 2, the vehicle 131 may include a gateway controller 204. The gateway controller 204 may include features and functionality as described in relation to the vehicle-based computing system 100 of FIG. 1. The gateway controller 204 may be configured to communicate between the external network 161 and the internal vehicle network (represented by a network switch 206).

The vehicle 131 may include a plurality of controllers or electronic control units (ECU). For example, the vehicle 131 may include a first controller 208 that is coupled to a first set 210 of sensors and actuators. The vehicle 131 may include a second controller 212 that is coupled to a second set 214 of sensors and actuators. The vehicle 131 may include a third controller 216 that is coupled to a third set 218 of sensors and actuators. The vehicle 131 may include a fourth controller 220 that is coupled to a fourth set 222 of sensors and actuators. The controllers (208, 212, 216, 220) and gateway controller 204 may include a processor and volatile and non-volatile memory. The controllers (208, 212, 216, 220) may further include interface circuitry for connecting to the associated set of sensors and actuators. The sensors may be configured to provide feedback signals for operating various vehicle features. The actuators may be configured to operate various vehicle features. Note that additional controllers may be present without limitation.

The controllers (208, 212, 216, 220) may be coupled to an internal vehicle network. The internal vehicle network may include a network switch 206. The network switch 206 may be configured to route data and messages between controllers, including the gateway controller 204, in the vehicle 131. The vehicle network may be an Ethernet network (IEEE 802). The controllers (208, 212, 216, 220) may each be configured with hardware and software components to interface with the vehicle network.

The controllers (208, 212, 216, 220) may be programmed to implement specific services. To perform a service, signals from one or more of the other controllers may be desired. The controllers (208, 212, 216, 220) may transmit signals over the internal vehicle network. Traditional automotive control ne are arranged statically such that the services are statically assigned to a predetermined controller. Such configurations are generally predetermined during the vehicle design phase and remain constant over the lifetime of the vehicle. Such designs do not efficiently handle adding features and functions after the vehicle is produced and sold. As automotive technology expands to include autonomous vehicles and increasing connectivity between vehicles and infrastructure, such static designs cannot keep pace. A more dynamic approach may yield vehicles with a longer useful life and increased customer satisfaction.

Services provide a high level of abstraction that safely hides the implementation details of the hardware devices from the developer. Newly added services can be automatically discovered and automatically/semi-automatically integrated into existing applications or used to build new applications. The decomposition of services into loosely coupled software modules provides high flexibility, re-usability, and extensibility and simultaneously eases the coexistence of different applications. Another benefit is the possibility of integrating services from various hardware and software vendors in a seamless manner. Furthermore, due to the high abstraction level, domain knowledge is sufficient to intuitively understand the functionality of services and to install and configure/reconfigure services in the network.

Each of the sensors and actuators may have an associated service routine that is implemented in the associated controller. The service routine may be a program or application that is configured to provide an interface for the associated sensor or actuator. The service routine may be referred to as a server for the sensor/actuator. The service routine may be configured to process the sensor input and provide the corresponding signal(s) to the vehicle network. The service routine may be configured to receive signals including requests to operate the actuators and provide signals to the actuators to achieve the requested operation. The controllers may be programmed to broadcast a list of available services over the internal vehicle network at initialization or upon request. The available services may be listed in the repository along with data identifying the controller in which the service is implemented.

Note that each controller may be programmed with a plurality of service routines. Further, there may be various levels of service routines. For example, a high-level service routine may interface with a number of low-level service routines in order to perform a function. In addition, some controllers may implement service routines that interface with service routines in other controllers. The architecture may be described as a distributed computing environment. The service routines may include interfaces for communicating over the vehicle network.

Each of the controllers (208, 212, 216, 220) may implement a real-time operating system that allows for services to be efficiently managed. The operating system may be configured to allow installation of service routines, removal of service routines, starting of service routines, and stopping of service routines. The real-time operating system may manage and coordinate the service routines (e.g., tasks) that are assigned to the controller. For example, the real-time operating system may trigger periodic execution of service routines that are periodically executed.

Figure 3:
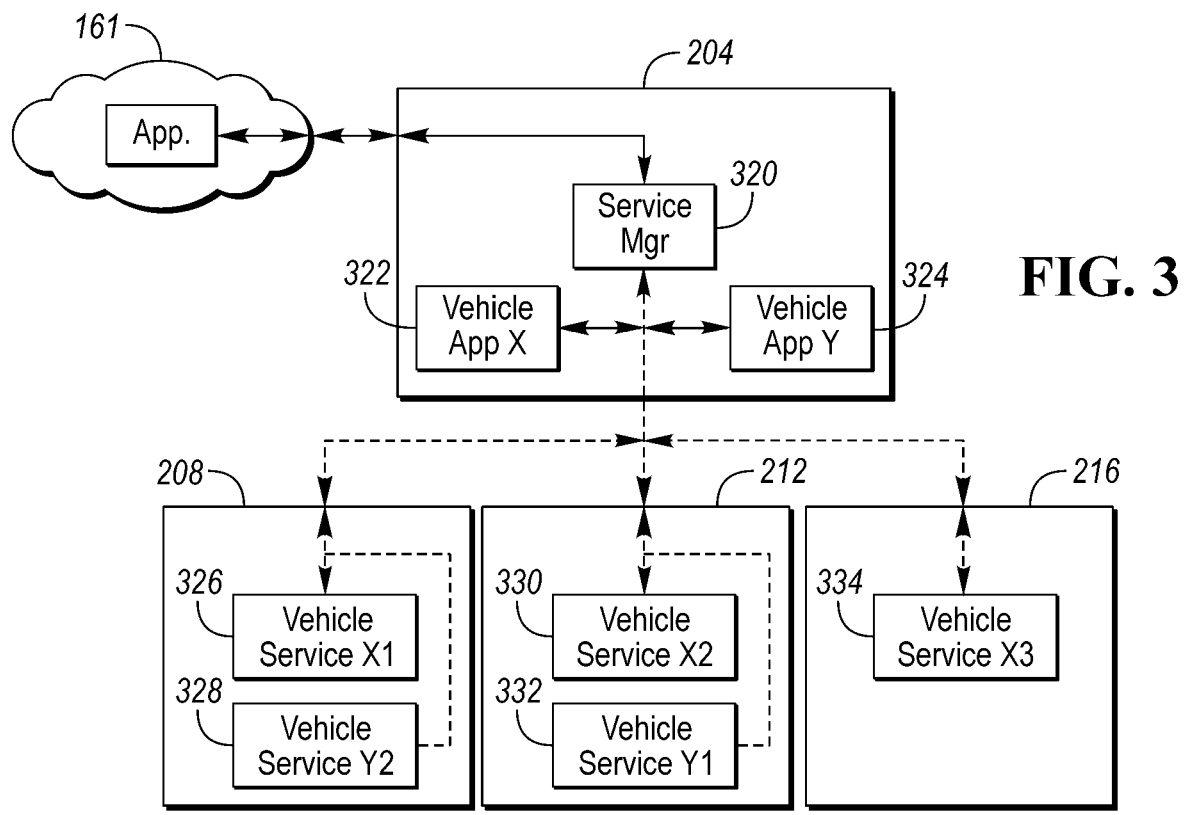
FIG. 3 is a possible configuration depicting distribution of service routines for services among controllers in a vehicle.

FIG. 3 depicts an example of a distributed embedded service oriented architecture for a vehicle. A gateway controller 204 may be programmed with a service manager application 320. The service manager application 320 may be configured to manage the service routines that are present in the controllers. The service applications that are available in the distributed computing environment may be registered with the service manager application 320. The service manager application 320 may be programmed to store a repository or database of available services and service routines and store the database in non-volatile memory for continued usage.

The service manager application 320 may be further configured to monitor the services that are distributed in the vehicle. The service manager application 320 may maintain a service registry that includes the status of each service and/or service routine. The service registry may include service version information, service compatibility information, a privileges list for each service, and service statistics. The service manager application 320 may be responsible for starting, stopping and resetting the services that are present in the vehicle. For example, the service manager 320 may interface with the operating system to provide commands for starting and stopping the service routines in the controllers. Each controller may collect information for the assigned services and transmit the service information over the vehicle Ethernet network to the service manager 320.

The service manager application 320 may also monitor the resources utilized by the service routines. For example, the service manager 320 may maintain a list of low-level routines used by each of the service routines. The service manager application 320 may maintain an associated service statistics for each of the service routines. Service statistics may be received from the service routines that are executed in the controllers.

The gateway controller 204 may further be programmed with a first service application 322 (e.g., Vehicle Application X) and a second service application 324 (e.g., Vehicle Application Y). The first service application 322 and the second service application 324 may be configured to coordinate and manage a particular service or feature that is implemented in multiple controllers.

The first controller 208 may be configured to implement a service routine 326 (e.g., Vehicle Service X1) that is associated with the first service application 322. The first controller 208 may be configured to implement a service routine 328 (e.g., Vehicle Service Y2) that is associated with the second service application 324). The second controller 212 may be configured to implement a service routine 330 (e.g., Vehicle Service X2) that is associated with the first service application 322. The second controller 212 may be configured to implement a service routine 332 (e.g., Vehicle Service Y1) that is associated with the second service application 324). The third controller 216 may be configured to implement a service routine 334 (e.g., Vehicle Service X3) that is associated with the first service application 322. Note that additional controllers may be present with additional service routines.

The first controller 208, the second controller 212, and the third controller 216 may be configured to communicate over the vehicle network. Each of the service routines may be configured to interface with vehicle network drivers to communicate signals over the vehicle network. The vehicle network may be an Ethernet network. Messages and signals exchanged by the controllers may be according to a defined protocol.

Each of the controllers may be coupled to one or more Ethernet networks in the vehicle. The gateway controller 204 may be configured to interface with an external network 161. For example, the gateway controller 204 may be configured to interface wirelessly to a remote network via a cellular network or wireless Ethernet connection. Communication to the remote network may use a (HTTP) through the Transmission Control Protocol (TCP).

A variety of protocols are available for communicating over an Ethernet network. Some applications may use TCP to communicate over the network. TCP includes features that ensures safe and error-free transmission of data over the network. The TCP defines how data is transported across the network. The vehicle communication system may use HTTP to transfer information between systems. The HTTP defines how the data is packaged and arranged for transmission over the network. The HTTP defines how requests for data and responses are handled. The TCP implementations generally require more memory and processing resources than may be available in embedded controllers. For example, TCP requires that connections be established in a multi-step handshake process before any messages are exchanged. This drives up start-up and communication times. Also, in TCP, the two communicating nodes may continuously hold their TCP sockets open for each other with a persistent session, which may be difficult to achieve with resource-constrained devices. TCP heartbeats may be additional overhead for resource-constrained devices. As a result, TCP may not be optimal for real-time systems in which rapid responses are preferable.

For embedded applications, such as a vehicle, a more resource efficient protocol may be preferred. One such protocol is the Constrained Application Protocol (CoAP). CoAP is targeted to embedded system and Internet of Things (IoT) applications. CoAP may be defined by Request For Comments (RFC) 7252 and related documents published by the Internet Engineering Task Force (IETF). CoAP-based systems may require less memory and processing resources than TCP-based systems. An embedded controller implementing CoAP may communicate using a User Datagram Protocol (UDP). The UDP is an alternative to the TCP. The UDP is designed to send data packets without providing checks to ensure that packets are not lost or received out of order. In contrast, TCP checks for and resends lost packets which increases overhead and latency. As such, UDP may be a more suitable protocol for real-time embedded applications.

Requirements are not the same for the Internet-based communications and vehicle network communication. For many vehicle applications, a very short timeout may be desired to react or respond in a very short time. Such features may be met using UDP as the application itself can be configured to handle the unlikely event of errors. For example, in use cases with cyclic data, the preferred approach may be to wait for the next data transmission instead of trying to repair the previous one. A disadvantage of UDP is that it does not handle segmentation and may only transport smaller packets of data. The software solution may support UDP and handle segmentation at the application layer. Current transport protocols for CAN and FlexRay limit messages to 4095 Bytes.

CoAP over UDP with associated Service Discovery mechanisms support a distributed and reconfigurable network architecture. Vehicle networks can be changed over time by adding new services and/or removing existing services. The CoAP service oriented architecture (SOA) platform supports these dynamic networks by providing a discovery mechanism for new services. Upon detection of a new service, the automatic/semi-automatic service composition may be used to provide a rapid integration of the new service with the running applications.

CoAP is fast and efficient due to reliance on low-overhead UDP. UDP is inherently and intentionally less reliable than TCP and depends on repetitive messaging for reliability instead of consistent connections. TCP is ideal for two communicating nodes to hold their TCP sockets open for each other continuously with a persistent session which may be difficult with resource-constrained devices.

The reliability of CoAP is through Quality of Service (QoS). It provides a simple method of providing confirmable and non-confirmable messages. The confirmable message may be acknowledged with an acknowledgement message (ACK) from the intended recipient. This confirms the message is received, but stops short of confirming that the message contents were decoded correctly or at all. A non-confirmable message is merely sent and forgotten. In an embedded automotive system, the vehicle network is generally in a closed environment and local to the vehicle.

CoAP can carry different types of data payloads, and can identify which payload type is being used. CoAP integrates with Extensible Markup Language (XML), JavaScript Object Notation (JSON), Concise Binary Object Representation (CBOR), or any data format. CoAP has a 4-byte fixed header and a compact encoding of options enables small messages that cause little or no fragmentation on the link layer.

A CoAP network is inherently one-to-one. However, it also supports one-to-many or many-to-many multi-cast messaging. This is inherent in CoAP because it is built on top of Internet Protocol version 6 (IPv6), which enables multicast addressing for devices in addition to their normal IPv6 addresses. CoAP is built as an application layer protocol above the Internet Protocol (IP) layer. Hence, CoAP works independent of the IP version. Services built with CoAP are portable and can be migrated to IPV6. CoAP supports both request/response based interaction model through a Representational State Transfer (REST) architectural style. Additionally, an observe interaction model supports a publish-subscribe (e.g., pub/sub) based interaction model.

CoAP is portable from small, embedded microcontrollers to high-end microprocessors. CoAP is an application protocol and can run on many operating systems (OS). Multiple language implementations are available to support cross platform integration/interoperability. There are many implementations of CoAP protocol. CoAP is developed as an Internet Standards Document, RFC 7252. CoAP is designed to interoperate with HTTP and the RESTful Web through simple proxies, making it natively compatible to the Internet. CoAP uses Datagram Transport Layer Security (DTLS) on top of the UDP transport protocol. DTLS is a complete security protocol that can perform authentication, key exchange, and protecting application data with the negotiated keying material and algorithms. CoAP end-points may be constrained by bandwidth and processing power. To optimize the performance of data transfer under these constraints, CoAP uses caching features consistent with HTTP.

Service choreography is a form of service composition in which the interaction protocol is between several partner services without a single point of control. Service orchestration is a form of service composition in which the relationship between all the participating services may be described by a single endpoint (i.e., the composite service). The orchestration includes the management of transactions between individual services. Orchestration employs a centralized approach for service composition. Using CoAP, both forms of service composition can be realized. Using a Client-Server pattern, a centralized orchestrator can implement the business logic to coordinate with other services to realize a need.

A vehicle communication system may be configured such that the vehicle network implements the CoAP. Communication over the vehicle network may use CoAP. The gateway controller 204 may implement CoAP for interfacing with the controllers that are connected to the vehicle network. Controllers connected to the vehicle network may also implement CoAP in order to communicate with the gateway controller 204. The gateway controller 204 may also be configured to communicate with the external network 161 using HTTP. The gateway controller 204 may be configured to translate between HTTP and CoAP to facilitate communication between the external network 161 and the vehicle network 206.

The vehicle service routines may be implemented as a CoAP client. Each of the vehicle service routines may manage and coordinate children processes or services that are implemented within the same controller. The vehicle service routines (e.g., CoAP clients) may exchange data using UDP datagram packets without the use of TCP/IP connections over the vehicle network. Data communication between the elements may follow a peer-to-peer communication protocol.

Service statistics and/or performance parameters may be collected by the controllers and reported to the service manager 320. The service manager 320 may report the service statistics to an external server connected to the external network 161 using an established HTTP-CoAP proxy. Service statistics may include processor utilization which may be expressed as a percentage of total possible utilization. Processor utilization may also be expressed as an amount of execution time over a time interval. The service statistics may include memory utilization which may be expressed as a percentage of total memory. Memory utilization may comprehend both volatile and non-volatile memory usage for the controller. The service statistics may include network utilization which may be expressed as an amount of data exchanged over the vehicle network over a time interval.

Performance parameters may include a response time of a service. For example, the service manager 320 may be configured to record an amount of time for a service to be completed. A time may be measured from when the service is started until the service is completed. A response time that exceeds a predetermined time may be indicative of reduced performance. Response times may be monitored for the various sub-services as well. Response times for the child services may be measured as the time between arrival of the request and completion of the request. The capability to monitor the various response times can be used to determined where processing bottlenecks may be occurring within a service.

Performance parameters may include a frequency of usage of the services and/or service routines. The controllers may be programmed to compute a number of requests for a service and/or service routine over a predetermined time interval. A higher frequency of usage may be indicative of a service that requires more processor time.

Performance parameters may include a status of the communication between the gateway controller 204 and the other controllers. The service manager 320 may be configured to monitor a loss of communication between controllers. For example, the service manager 320 may record a time associated with the last received message from a controller. An elapsed time since the last recorded time that exceeds a predetermined time may be indicative of a loss of communication with the controller (e.g., reduced performance).

Performance parameters may include a network bandwidth utilization between the controllers. The service manager 320 may be configured to monitor traffic on the vehicle network. The service manager 320 may be further configured to determine network utilization for each of the services. For example, network utilization for each of the services may be determined by monitoring message traffic for each of the services. The network bandwidth may be expressed as a percentage of total network bandwidth that is consumed by communication with the controller.

Using this protocol, fault management may be simplified in a service-oriented distributed architecture. Any fault or reduced performance condition detected by a service can be propagated to other services. A parent service can decide to self-heal the system by resetting/recovering the child service or can propagate the error to the root service (service manager 320). The service manager 320 may implement a policy and can attempt to recover by resetting the service or the system based on criticality of the fault. The service manager 320 can report the Fault/Error statistics of a given service to the external server connected to the external network 161.

Services may need to react to system/user events such as Ignition On-Off events or factory resets. The service manager 320 can multicast these messages on the network and the services can decide the order in which the services are turned on/off. The parent service may decide the order for all its child nodes. Various other system/user events are possible.

The connectivity status of the vehicle network can be easily identified due to the multicast of messages. For example, a traffic application establishing a link to the traffic server residing on the cloud may need to know the optimized connectivity path before attempting to establish the link. The application may communicate with a local network service to establish the optimized link. The controller that monitors and publishes the status of the connection (e.g., WIFI, Cellular, Bluetooth) can multicast the status over the vehicle network for all the services that need the connectivity status. The network service routine residing on the controller where the traffic application is running can subscribe to this information and cache it locally. The controller may determine the optimized path and establish the link for the application based on the cached information. The Traffic application can then connect to external traffic server through the optimized link provided to it by network service.

The service manager 320 that is executing in the gateway controller 204 may monitor each of the services that are implemented in the system. In response to the performance parameters being indicative of a reduction in performance of a service or service routine, the service manager 320 may dynamically allocate the associated routines between the controllers. For example, responsive to data indicating reduced performance of a first controller, the service manager 320 may transfer the service routine that is executing in the first controller to a second controller. The service manager 320 may send instructions or commands to the first controller to stop executing the associated service routines. The service manager 320 may then transfer the service routine to the second controller for installation. The service manager 320 may update the repository and send a command to the second controller to start the transferred service routine. The service manager 320 may retrieve the service routine from an external server connected to the external network. The service manager 320 may receive the service routine from the first controller upon request.

In some configurations, a new service and associated service routines may be received by the service manager 320. For example, the new service may be received from an external server from the external network 161. The service manager 320 may check the service statistics of each controller to determine in which controller the new service routines should be allocated. For example, performance data including processor and memory utilization may be checked. In addition, the service manager 320 may determine which low-level services are required by the new service routines. The service manager 320 may attempt to allocate the new service routine to minimize network traffic by allocating the new service routine to a controller that is executing low-level services used by the new service routine. The service manager 320 may transmit the new service routines over the vehicle network to the selected controllers. After the new service routines are installed, the service manager 320 may issue a start command for the new service that causes the new service routines to begin executing.

Examples of potential new services are many. Examples include diagnostic and troubleshooting service routines that may be loaded and executed by a service facility. The diagnostic service routines may aid in diagnosing various component conditions. The advantage of this architecture is that new service routines can be installed and executed to perform specific functions. The new service routines could be temporary routines that are removed after they have been used. Other potential new services may include enabling new features or functions. For example, vehicle functions may be upgraded over time requiring additional service routines.

FIG. 4 depicts a possible flowchart 400 for a sequence of operations that may be performed by the service manager 320. Note that the operations depicted may be performed in parallel for any number of services. The operations may be continually repeated for each of the services and service routines. At operation 402, the service manager 320 may receive and/or compute performance parameters. The performance parameters may include those parameters and service statistics previously discussed herein. The performance parameters may be received from the service routines that are running in the controllers.

At operation 404, the service manager 320 may monitor the services that are currently installed in the vehicle. For example, the service manager 320 may monitor the database of services and associated parameters to determine if the services are running properly. The service manager 320 may check the parameters to ensure the availability of each of the services. The result of the monitoring may be a request to add, remove or transfer service routines.

At operation 406, the service manager 320 may perform a check to determine if any new services are to be added. The service manager 320 may receive a request from the external server to install a new service. If a new service is to be added, operation 408 may be performed. At operation 408, the service routines associated with the new service may be allocated to the controllers according the performance parameters as described herein.

If there are no new services to be added, operation 410 may be performed to check if any services are to be removed. If a service is to be removed, operation 412 may be performed to stop and remove the associated service routines from the controllers. For example, a service that has been temporarily added may be removed after the service has been executed. A command to remove the service may be received by the service manager 320 from the external server.

If no services are to be removed, operation 414 may be performed to determine if any of the performance parameters are indicative of reduced performance for the associated service. If the performance parameters for one or more services are indicative of reduced performance, operation 416 may be performed to command a restart (e.g., stop followed by start) of the service routine. At operation 418, a check may be performed to determine if the restart was sufficient to eliminate the reduce performance condition. That is, the performance parameters may be checked to determine if the reduction in performance is still present. If the performance parameters indicate normal operation, execution may be returned to operation 402. If reduced performance conditions are still present, operation 420 may be performed to reallocate the affected service routines to another controller as described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a sensor;
    a plurality of controllers configured to communicate over an internal network of the vehicle; and
    a gateway device including circuitry and in communication with the controllers via the internal network and coupled to an external network,
    wherein a first of the controllers is programmed to, responsive to receiving a signal from the sensor, generate and send a service request corresponding to the signal to the gateway device, and
    wherein the gateway device is programmed to,
        responsive to receiving the service request, generate and send a service command to a second of the controllers to start a new service defined by a plurality of routines previously unknown to the second of the controllers and enabling the second of the controllers to perform functionality corresponding to the new service, and
        responsive to detecting a performance reduction of the second of the controllers, transfer at least one of the routines to a third of the controllers such that the at least one of the routines no longer resides with the second of the controllers and the second and third of the controllers cooperatively execute the routines to perform the functionality.

2. The vehicle of claim 1 wherein the internal network of the vehicle is an Ethernet network and the controllers are further configured to implement a Constrained Application Protocol (CoAP) over the Ethernet network.

3. The vehicle of claim 1 wherein the detecting includes detecting a response time of the service exceeding a predetermined time.

4. The vehicle of claim 1 wherein the detecting includes detecting a loss of communication for more than a predetermined time between the gateway device and the first of the controllers.

5. The vehicle of claim 1 wherein the detecting includes detecting a communication bandwidth between the first of the controllers and the gateway device being less than a predetermined bandwidth.

6. The vehicle of claim 1 wherein the gateway device is further configured to, responsive to performance data indicating reduced performance, send a command to the first of the controllers to stop and restart the routines.

7. A vehicle comprising:
    a plurality of controllers programmed to execute a plurality of routines to perform a service and communicate over a vehicle network using Constrained Application Protocol (CoAP); and
    a gateway controller including circuitry and configured to communicate with an external server using Hyper Text Transfer Protocol (HTTP), and communicate over the vehicle network using CoAP, wherein a first of the controllers is programmed to, responsive to receiving a signal from the external server via the gateway controller, generate and send a service request corresponding to the signal to the gateway controller, and wherein the gateway controller is programmed to, responsive to receiving the service request, generate and send a service command to a second of the controllers to start a new service defined by a plurality of routines previously unknown to the second of the controllers and enabling the second of the controllers to perform functionality corresponding to the new service, and responsive to detecting a performance reduction of the second of the controllers, transfer at least one of the routines to a third of the controllers such that the at least one of the routines no longer resides with the second of the controllers and the second and third of the controllers cooperatively execute the routines to perform the functionality.

8. The vehicle of claim 7 wherein the gateway controller is further programmed to transfer performance parameters to the external server.

9. The vehicle of claim 7 wherein the detecting is based on a response time between an arrival of a request to perform a service and completion of the request.

10. The vehicle of claim 7 wherein the detecting is based on a communication bandwidth between controllers utilized over the vehicle network.

11. The vehicle of claim 7 wherein the detecting is based on a frequency of usage for the service.

12. The vehicle of claim 7 wherein the gateway controller is further programmed to, responsive to receiving a plurality of new service routines for performing another new service from the external server, dynamically allocate and transfer the new service routines to the controllers based on performance parameters.

13. The vehicle of claim 7 wherein the gateway controller is further programmed to allocate the routines based on resource usage and remaining processing capacity of the controllers.

14. A vehicle communication system comprising:
a plurality of controllers; and
a gateway device including a circuitry and programmed to communicate with an external server using Hyper Text Transfer Protocol (HTTP), communicate with the plurality of controllers via an internal vehicle network using Constrained Application Protocol (CoAP) protocol, wherein a first of the controllers is programmed to, responsive to receiving a signal from the external server via the gateway device, generate and send a service request corresponding to the signal to the gateway device, and wherein the gateway device is programmed to, responsive to receiving the service request, generate and send a service command to a second of the controllers to start a new service defined by a plurality of routines previously unknown to the second of the controllers and enabling the second of the controllers to perform functionality corresponding to the new service, and responsive to detecting a performance reduction of the second of the controllers, transfer at least one of the routines to a third of the controllers such that the at least one of the routines no longer resides with the second of the controllers and the second and third of the controllers cooperatively execute the routines to perform the functionality.

15. The vehicle communication system of claim 14 wherein the gateway controller is further programmed to receive performance parameters from the controllers.

16. The vehicle communication system of claim 14 wherein the gateway controller is further programmed to communicate performance parameters to the external server.

17. The vehicle communication system of claim 14 wherein the gateway controller is further programmed to receive service statistics from each of the controllers and transmit the service statistics to the external server.

18. The vehicle communication system of claim 14 wherein the gateway controller is further programmed to arbitrate access to the external server for the controllers.

* * * * *